United States Patent
Biswas et al.

(10) Patent No.: US 11,532,106 B2
(45) Date of Patent: Dec. 20, 2022

(54) COLOR GRADIENT CAPTURE FROM SOURCE IMAGE CONTENT

(71) Applicant: Adobe Inc., San Jose, CA (US)

(72) Inventors: Mainak Biswas, Noida (IN); Stephen Joseph DiVerdi, Berkeley, CA (US); Jose Ignacio Echevarria Vallespi, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/519,623

(22) Filed: Nov. 5, 2021

(65) Prior Publication Data

US 2022/0058841 A1     Feb. 24, 2022

Related U.S. Application Data

(63) Continuation of application No. 16/687,415, filed on Nov. 18, 2019, now Pat. No. 11,182,932.

(51) Int. Cl.
*G06T 11/00* (2006.01)
*G06T 7/90* (2017.01)

(52) U.S. Cl.
CPC .......... *G06T 11/001* (2013.01); *G06T 7/90* (2017.01); *G06T 2200/24* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 8,902,248 B1* | 12/2014 | Bidarkar | H04L 67/025 709/219 |
| 2004/0164992 A1* | 8/2004 | Gangnet | G06T 11/001 345/591 |
| 2016/0098972 A1* | 4/2016 | Feit | G06T 11/001 345/593 |
| 2018/0191925 A1 | 7/2018 | Stauder et al. | |

OTHER PUBLICATIONS

Jin et al., "A Quaternion Gradient Operator for Color Image Edge Detection", 2013 IEEE International Conference on Image Processing. IEEE, 2013. (Year: 2013).*

(Continued)

*Primary Examiner* — Tapas Mazumder
(74) *Attorney, Agent, or Firm* — Kilpatrick Townsend & Stockton LLP

(57) ABSTRACT

A method for generating a color gradient includes receiving an input indicating a smoothness of the color gradient and detecting a gradient path defined from an image. The method also includes identifying a set of colors from the gradient path. The method includes detecting a set of color pivots associated with the set of colors. A number of the color pivots in the set of color pivots is based on the input indicating the smoothness of the color gradient. The method includes generating a set of individual color gradients along the gradient path including a color gradient between a first pair of colors located at a first pair of the color pivots and a different color gradient between a second pair of colors located at a second pair of the color pivots. Additionally, the method includes generating the color gradient of the image from the set of individual color gradients.

20 Claims, 11 Drawing Sheets
(2 of 11 Drawing Sheet(s) Filed in Color)

(56) References Cited

OTHER PUBLICATIONS

"Adobe Capture", Adobe, Available Online at: https://helpx.adobe.com/in/mobile-apps/help/capturefaq.html, Accessed from Internet on Sep. 25, 2020, 5 pages.

"Adobe Color", Adobe, Available Online at: https://color.adobe.com/create, Accessed from Internet on Sep. 25, 2020, 1 page.

"Heron's Formula", Wikipedia, Available Online at: https://en.wikipedia.org/wiki/Heron%27s_formula, Accessed from Internet on Sep. 25, 2020, 6 pages.

"Self-Organizing Map", Wikipedia, Available Online at: https://en.wikipedia.org/wiki/Selforganizing_map, Accessed from Internet on Sep. 25, 2020, 6 pages.

U.S. Appl. No. 16/687,415 , First Action Interview Office Action Summary, dated Feb. 25, 2021, 4 pages.

U.S. Appl. No. 16/687,415 , First Action Interview Pilot Program Pre-Interview Communication, dated Jan. 1, 2021, 4 pages.

U.S. Appl. No. 16/687,415 , Notice of Allowance, dated Jul. 27, 2021, 8 pages.

Grenn , "The Secret of Great Gradient", Available Online at: https://uxplanet.org/the-secret-ofgreat-gradient-2f2c49ef3968?gi=88360591a288, Dec. 14, 2017, 11 pages.

Nguyen et al., "Data-Driven Color Manifolds", Association for Computing Machinery Transactions on Graphics, Available Online at: http://resources.mpiinf.mpg.de/ColorManifolds/paperLowRes.pdf, Mar. 2015, 9 pages.

\* cited by examiner

COLOR GRADIENT CAPTURE FROM SOURCE IMAGE CONTENT

CROSS-REFERENCE TO RELATED APPLICATIONS

This application is a continuation of U.S. patent application Ser. No. 16/687,415, filed on Nov. 18, 2019, now allowed, the contents of all of which are incorporated herein by reference in its entirety for all purposes.

TECHNICAL FIELD

This disclosure relates generally to image manipulation systems and methods that capture color gradients from source images. More specifically, but not by way of limitation, this disclosure relates to identifying color shifts in colors of a source image and producing gradients between colors associated with the color shifts.

BACKGROUND

Color gradients provide artistic and colorful presentations used in graphic design. For example, a background of a website or a sign board may employ the visually appealing look of a color gradient. Color gradients may also be used to emphasize more important portions or features in an artistic or informative presentation. Image manipulation applications include features that generate color gradients based on colors selected by a user or based on prepopulated color gradients.

Existing applications that generate color gradients rely heavily on user input to identify colors for use in the gradients. In other examples, the color gradients are prepopulated in the existing applications based on input from a creator of the application. In one example, the user input includes manually identifying a set of colors (e.g., red and green), and the application generates a color gradient that transitions from one color (e.g., red) to another color (e.g., green). The application creator may also prepopulate the application with common or perceived common color gradient transitions. In either example, the color gradient transitions are usable in graphic designs.

Often, these color gradients selected by a user or an application creator are not color transitions that are observable in nature. Such color transitions may lead to an awkward or otherwise uncomfortable viewing experience for an observer of the color gradient. Manual identification of colors used in color gradients for graphic designs may lead to an increased user error (e.g., identifying unnatural color combinations) resulting in the uncomfortable viewing experiences. Further, heavy reliance on user input increases opportunities for overall user frustration within a computer application.

SUMMARY

Certain embodiments involve generating a color gradient from color information of a source image. Techniques for generating the color gradient include receiving a user input indicating a smoothness of the color gradient. The techniques also include detecting a color gradient path defined from the source image. Further, the techniques include identifying a set of colors from the color gradient path within the source image. Furthermore, the techniques include detecting a set of color pivots associated with the set of colors identified from the color gradient path. A number of the color pivots in the set of color pivots is based on the user input indicating the smoothness of the color gradient. Additionally, the techniques include generating a set of individual color gradients along the color gradient path. The set of individual color gradients includes a color gradient between a first pair of colors respectively located at a first pair of the color pivots and a different color gradient between a second pair of colors respectively located at a second pair of the color pivots. Moreover, the techniques include generating the color gradient of the source image from the set of individual color gradients.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
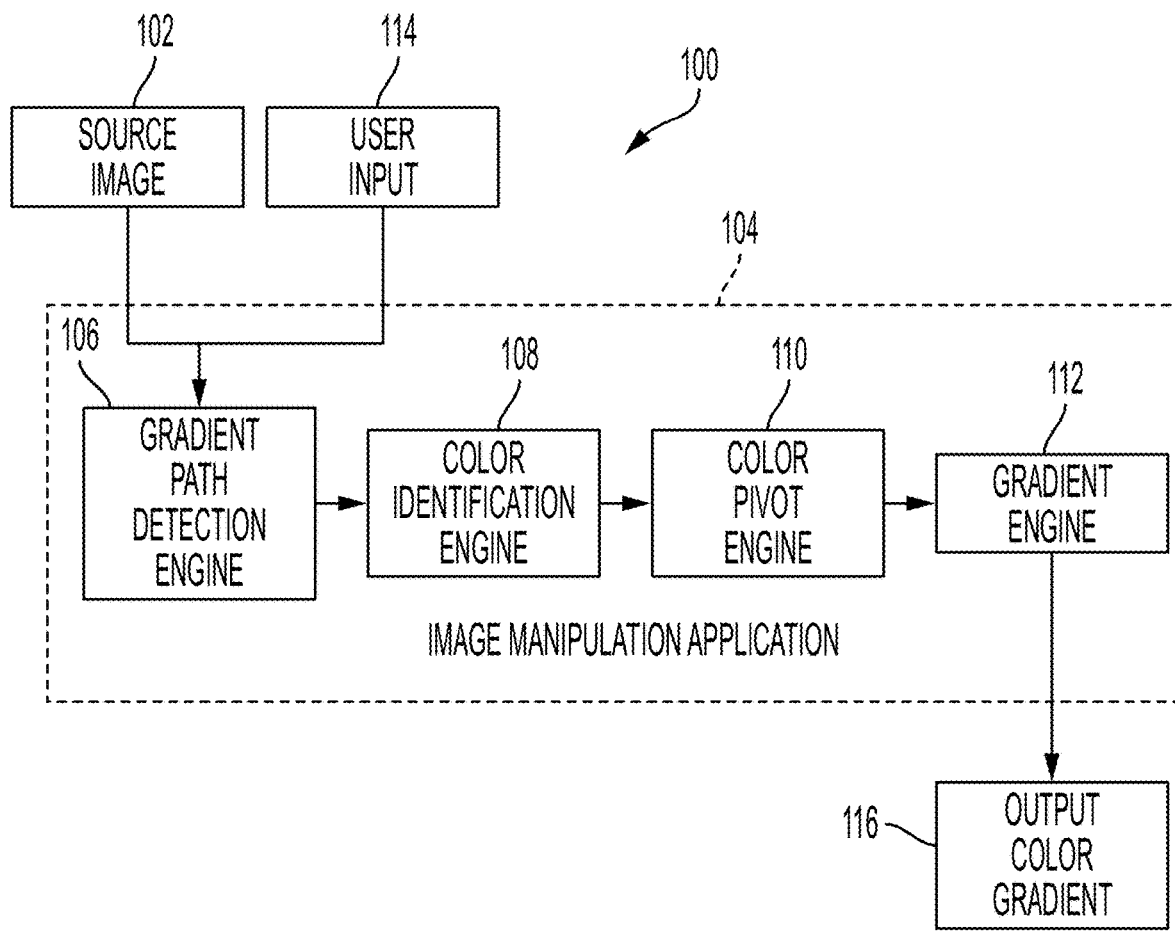
FIG. 1 depicts an example of a computing environment for generating a color gradient output from a source image, according to certain embodiments of the present disclosure.

Certain embodiments involve using an image manipulation application to generate a color gradient from a gradient path of a source image. As explained above, conventional solutions for generating color gradients rely heavily on user input and limited prepopulated gradients selectable by the user. Certain embodiments described herein address this issue by, for example, automatically identifying color gradients in source images. For instance, a source image received by an image manipulation application may include color gradients or transitions that occur naturally or in the real world. By identifying a gradient path across a source image (e.g., automatically or through a user input), the image manipulation application is able to generate a color gradient that tracks colors present in the source image. In some embodiments, identifying color gradients from the source image in an automated manner reduces the amount of manual user interaction required for generating the color gradient, thereby increasing efficiency and decreasing user error that is disruptive to completion of the color gradient.

The following non-limiting example is provided to introduce certain embodiments. In this example, an image manipulation system having one or more processing devices executes image manipulation modules to capture information from source images received by the image manipulation system. The image manipulation system receives a source image and a user input. The source image may be any image that includes at least some variance in color. In an example, the user input is an indication of a desired smoothness of a color gradient generated from the source image. Additionally, the user input can be a gradient path designated by a user across a display device that is displaying the source image.

Continuing with this example, the image manipulation system identifies a set of colors along the gradient path and selects colors from the set of colors for use as gradient color pivots. Color pivots are color representations at which color gradients end a gradient transition. For instance, in a source image that transitions from a blue color to a red color to a green color, the color pivot occurs at the red color where a first gradient transition from blue to red ends and a second gradient transition from red to green begins. The image manipulation system selects these color pivots based on the indication of the desired smoothness of the color gradient. The smoothness can indicate how many different color pivots (and thus, how many gradient transitions) are to be included in the gradient path. For example, if the user input specifies a greater smoothness, the image manipulation system selects a smaller number of color pivots so that a color gradient transitions over a smaller number of colors. That is, the color gradient is less disjointed. Similarly, if the user input specifies a lower smoothness, the image manipulation system selects a larger number of color pivots so that a color gradient transitions over a larger number of colors. That is, the color gradient is more disjointed and also more detailed.

In this example, the image manipulation system also generates a set of individual color gradients along the color gradient path. For instance, the image manipulation system generates the individual color gradients between color hues of the color pivots identified along the color gradient path. The image manipulation system combines the individual color gradients that have been identified, and thereby generates an overall color gradient of the color gradient path along the source image.

Certain embodiments provide improvements over existing image manipulation tools for generating color gradients based on color depicted in source images. For instance, existing software tools require designers to manually identify colors used in color gradients for graphic designs. These manual identifications may result in color transitions that are not observable in nature, or that otherwise lead to an awkward or otherwise uncomfortable viewing experience for an observer of the color gradient. Thus, reliance on manual identification of colors for color gradients decreases the utility of image manipulation tools. Embodiments described herein can facilitate an automated process for generating color gradients used for creating or editing digital content, where the automated process provides results that are more likely to be desirable to a designer without relying on subjective, manual selections by the designer. In this automated process, color gradients utilize selections via interface tools (e.g., user inputs identifying smoothness of a gradient, user inputs defining a gradient path with respect to a source image, or both) to automatically determine color pivots for a color gradient. Thus, the automated process for generating a gradient applies particular rules in a manner that reduces or eliminates the need for subjective judgments and/or manual efforts involved in prior techniques. A process that applies these rules can rapidly output a suggested color gradient, which can then be fine-tuned if desired. The particular rules used to automate this process can improve the operation of software tools used to edit digital content, e.g., by reducing the potential for error associated with techniques performed with existing tools, providing improved aesthetic quality as compared to the subjective efforts involved in techniques performed with existing tools, or both.

Example of an Operating Environment for Automatically Generating a Color Gradient Referring now to the drawings, FIG. 1 depicts an example of a computing environment 100 for generating color gradients of a source image 102. The computing environment includes an image manipulation application 104, which is executed by one or more computing devices. In some examples, the image manipulation application 104 is implemented using a computing network (e.g., a cloud computing network, software-as-a-service implementation). The image manipulation application 104 includes a gradient path detection engine 106, a color identification engine 108, a color pivot engine 110, and a gradient engine 112.

The gradient path detection engine 106 receives the source images 102 and a user input 114 to automatically analyze and identify the colors present within the source image 102. In one example, the source image 102 is provided to the image manipulation application 104 by a user. In another example, the source image 102 is randomly selected from a bank of images stored in a memory associated with the computing environment 100. Further, the user input 114 identifies a desired smoothness of an output color gradient 116 (e.g., how many color pivots are desired within the output color gradient 116).

In one or more examples, the user input 114 also identifies a gradient path along the source image 102 from which the output color gradient 114 is determined. In other examples, the gradient path is selected automatically for the source image 102. In such an example, a set of diagonal paths across the source image 102 are automatically generated and analyzed to determine a gradient goodness score, as described below with respect to FIG. 10. The gradient goodness score is a measure of color variance along the diagonal path. The diagonal path with the greatest gradient goodness score (i.e., with the greatest color variance along the diagonal path) may be selected for use as the gradient path along the source image 102.

Based on detecting the gradient path of the source image 102, the color identification engine 108 performs an operation to assign a color representation to each pixel along the gradient path. In an example, each pixel along the gradient path is assigned a color representation based on an average of color representations in a radius of pixels surrounding each pixel on the gradient path. The radius of pixels surrounding the pixel on the gradient path may be a twenty-pixel radius. A larger or smaller radius may also be selected.

The average color representation for the pixels within the radius surrounding the pixel on the gradient path ensures that small artifacts within the source image 102 at the location of the pixel on the gradient path are ignored. Accordingly, colors along the gradient path that are part of a small artifact become limited in importance for capturing the output color gradient 114. In an example, each pixel along the gradient path is assigned the average color representation determined for that pixel.

The average color representation for each pixel of the gradient path is provided to the color pivot engine 110 for a determination of the color pivots used in the output color gradient 116. The color pivots used in the output color gradient 116 indicate colors of the source image 102 that are used as pivot points in the output color gradient 116. A number of color pivots is determined from the user input 114. For example, the user input 114 provides an indication of a number of color pivots a user desires either directly (e.g., the user enters a number value for the number of color pivots) or indirectly (e.g., a user indicates a smoothness desired for the output color gradient 116). A technique for determining the color pivots used in the output color gradient 116 is described below with respect to FIGS. 6-8.

The color pivots, including gradient path start and end colors, are provided to the gradient engine 112 for generation of the individual color gradients. The gradient engine 112 generates the individual color gradients between successive color pivots. For example, the gradient engine 112 generates an individual color gradient between a color representation of a pixel that begins the gradient path and a first color pivot. The gradient engine 112 continues to generate the individual color gradients until an individual color gradient between a final color pivot and a color representation of a pixel that ends the gradient path is generated. Based on generation of the individual color gradients, the gradient engine 112 combines the successive color gradients to generate the output color gradient 116. The output color gradient 116 may be displayed in a new image or stored in a memory of the computing environment 100 for future use within the image manipulation application 104 or other application of the computing environment 100 where the output color gradient 116 would be useful.

Examples of Generating a Color Gradient

Figure 2:
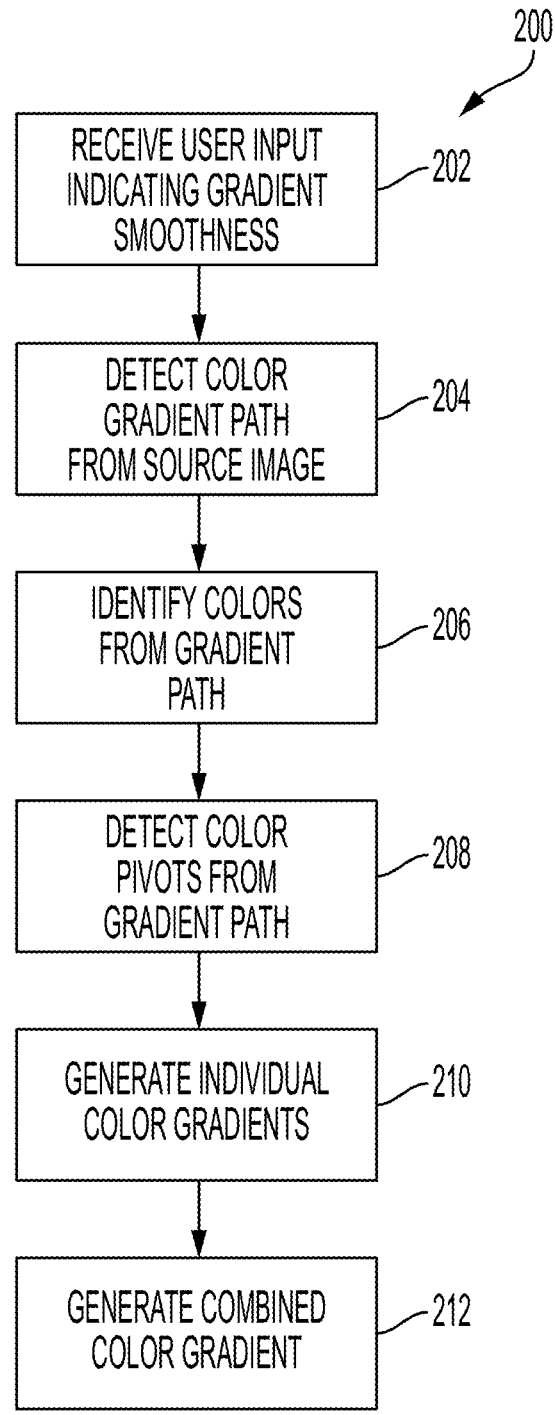
FIG. 2 depicts an example of a process for generating a color gradient from a source image, according to certain embodiments of the present disclosure.

FIG. 2 depicts an example of a process 200 for generating the output color gradient 116 using the source image 102. One or more processing devices implement operations depicted in FIG. 2 by executing suitable program code (e.g., the image manipulation application 104). For illustrative purposes, the process 200 is described with reference to certain examples depicted in the figures. Other implementations, however, are possible.

At block 202, the process 200 involves the image manipulation application 104 receiving user input indicating a gradient smoothness of the output color gradient 116. One or more processing devices execute the image manipulation application 104 (or other suitable program code) to implement block 202. For instance, the image manipulation application 104 may provide a user interface that enables a user to provide input regarding gradient generation preferences. In some embodiments, the image manipulation application 104 receives an indication of how smooth the user would like the output color gradient 116 to be. In such an example, an indication of a smoother output color gradient 116 results in a smaller number of color pivots, while a preference for a more segmented output color gradient 116 results in a larger number of color pivots. In another embodiment, the image manipulation application 104 receives a number of color pivots for the output color gradient 116.

At block 204, the process 200 involves the gradient path detection engine 106 detecting a color gradient path from the source image 102. For instance, executing the image manipulation application 104 causes the gradient path detection engine 106 to either detect a user input of the gradient path along the source image 102, or to automatically generate a gradient path based on a set of diagonal paths across the source image 102, as describe below with respect to FIG. 10.

At block 206, the process 200 involves the color identification engine 108 identifying colors from the gradient path. For instance, executing the image manipulation application 104 causes the color identification engine 108 to determine color representations for each pixel along the gradient path of the source image 102. In an example, the color identification engine 108 determines the color representation for each pixel based on an average color of the pixels within a radius surrounding the pixel. In such an example, the radius may be a twenty-pixel radius surrounding each pixel along the gradient path. Other radii may also be used.

At block 208, the process 200 involves the color pivot engine 110 detecting color pivots from the gradient path. For instance, executing the image manipulation application 104 causes the color pivot engine 110 to determine the color representations along the gradient path for use as pivot points in the output color gradient 116. In an embodiment, the color pivot engine 110 determines a first color pivot of the output color gradient 116 by finding a largest area of a triangle formed from color representation values of a beginning pixel of the gradient path, an end pixel of the gradient path, and each interim pixel in the gradient path. By finding the color representation of the interim pixel that generates the largest area of the triangle, the color pivot engine 110 determines the pixel color that represents a color most different from both the beginning pixel and the end pixel.

If more color pivots are desired, the image manipulation application 104 repeats the largest triangle area process recursively in two segments (e.g., (i) a first segment including the beginning pixel of the gradient path and the interim pixel of the previous color pivot and (ii) a second segment including the interim pixel of the previous color pivot and the end pixel of the gradient path). The two identified color representations that generate the largest triangle areas in their respective segment are compared, and the identified color representation with the largest triangle area between the two becomes the subsequent color pivot. This process is repeated until the number of color pivots identified by the user input 114 has been reached.

At block 210, the process 200 involves generating individual color gradients between the successive color pivots identified at block 208. One or more processing devices execute the image manipulation application 104 to implement block 210. For instance, executing the image manipulation application 104 causes the gradient engine 112 to generate the color gradients. In an embodiment, the gradient engine 112 generates a color gradient between a color representation of the beginning pixel of the gradient path and a color representation of a first color pivot, a color gradient between the first color pivot and a second color pivot, and so on until the gradient engine 112 generates a color gradient between a color representation of a penultimate color pivot and a color representation of an end pixel of the gradient path.

At block 212, the process 200 involves generating the output color gradient 116 from the individual color gradients generated at block 210. One or more processing devices execute the image manipulation application 104 to implement block 212. For instance, executing the image manipulation application 104 causes the gradient engine 112 to combine the individual color gradients into the output color gradient 116. The output color gradient 116 may be displayed on a display screen of a device, or the output color gradient 116 may be stored within a memory of the computing environment 100 for future use with one or more systems of the computing environment 100.

Figure 3:
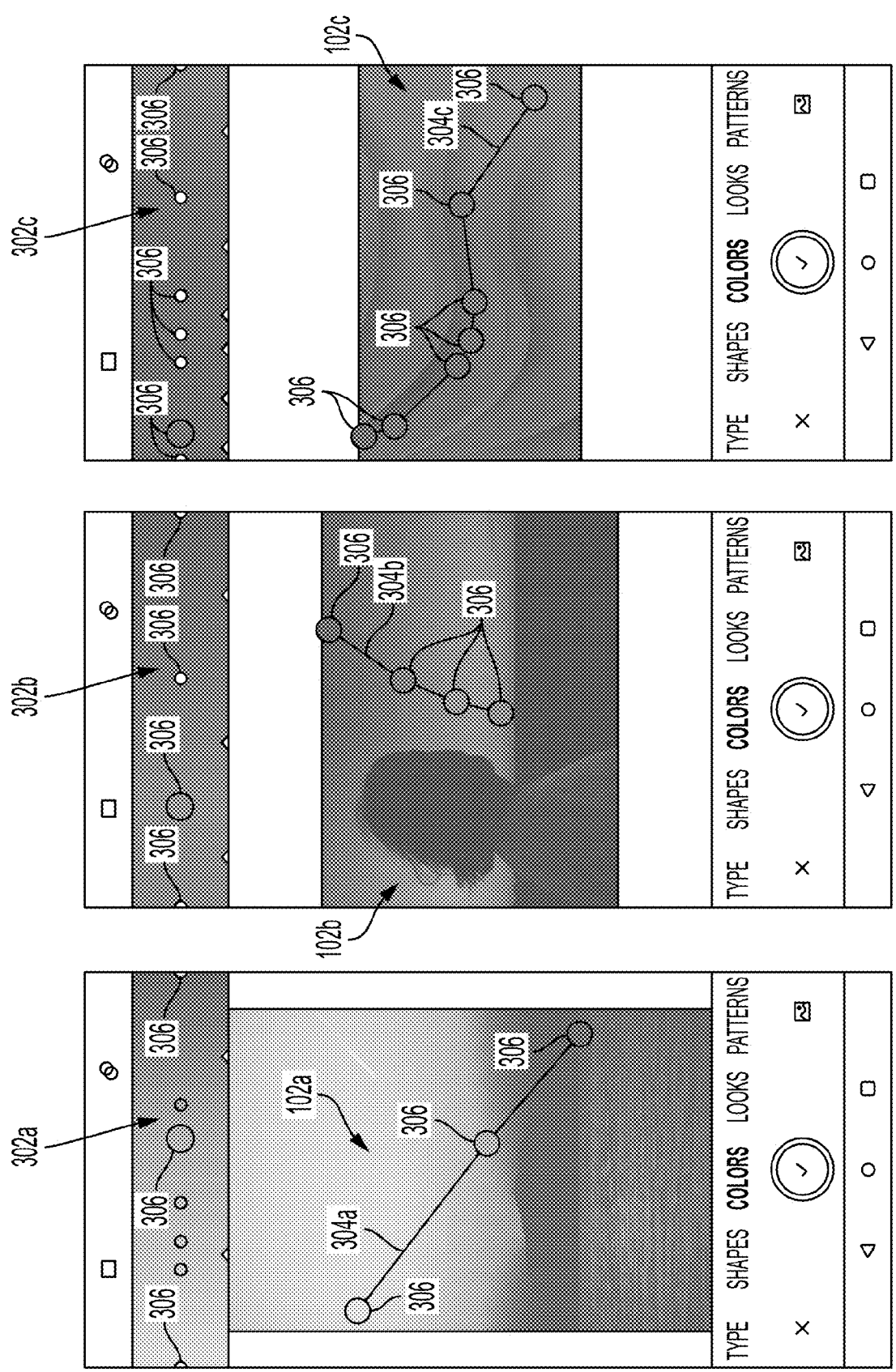
FIG. 3 depicts examples of source images and color gradients generated from the source images, according to certain embodiments of the present disclosure.

FIG. 3 depicts examples of source images 102a, 102b, and 102c and color gradients 302a, 302b, and 302c generated from the source images 102a, 102b, and 102c. Also included in the source images 102a, 102b, and 102c are gradient paths 304a, 304b, and 304c, respectively. Additionally, the source images 102 and the color gradients 302 include indications of locations where color pivots 306 occur within the source images 102. As discussed above with respect to FIGS. 1 and 2, the color pivots 306 are color representations at which the color gradients end a gradient transition, begin a gradient transition, or both. Further, a position of the color pivots 306 on the color gradient 302 may be equal to a pixel number of the color pivot 306 on the gradient path 304 divided by a total number of pixels along the gradient path 304. For example, if the color pivot 306 is at a $75^{th}$ pixel of a 100 pixel gradient path, the color pivot 306 on the color gradient 302 is located three-quarters of the way along the color gradient 302.

Figure 4:
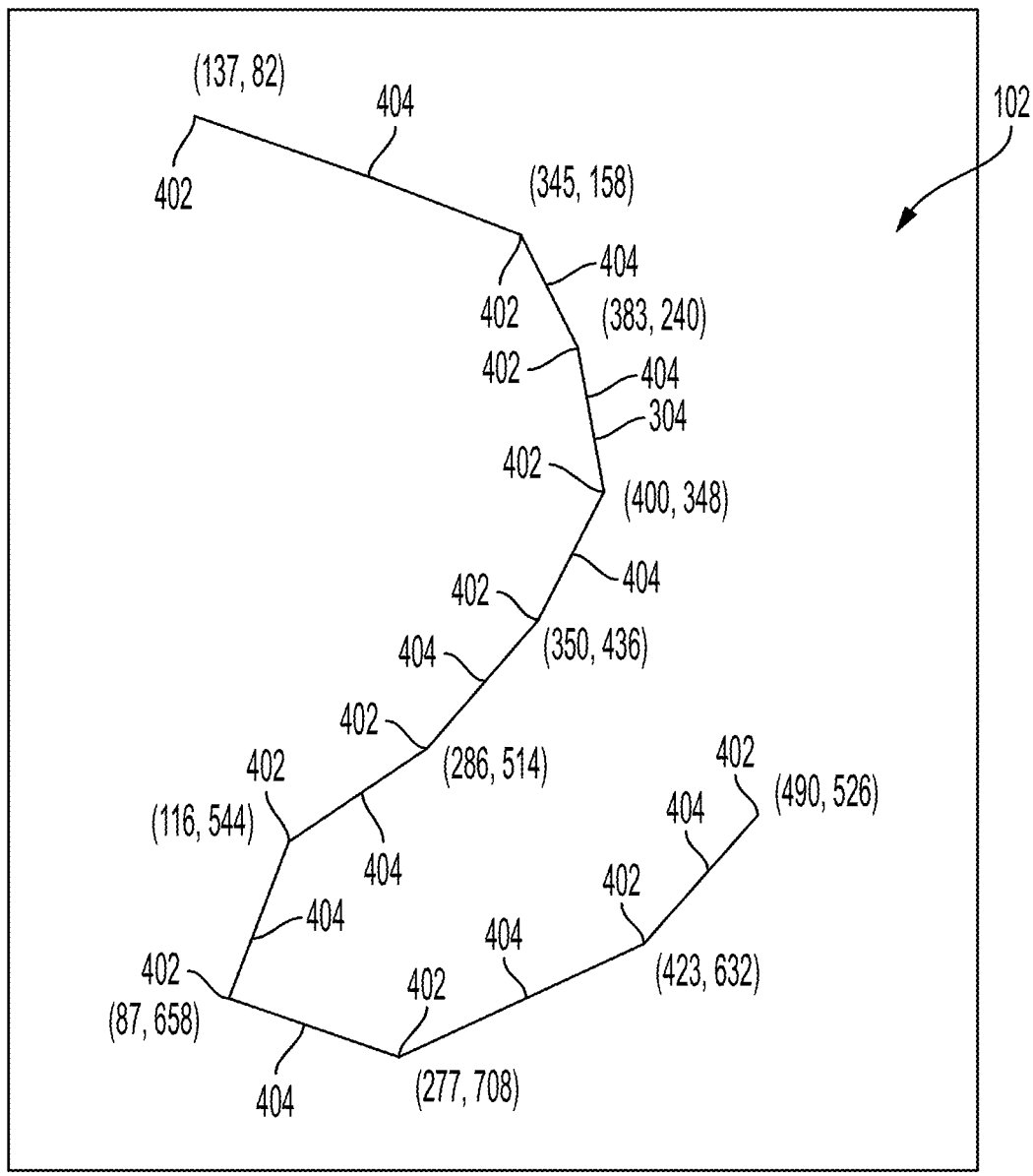
FIG. 4 depicts an example of a gradient path input by a user along a source image, according to certain embodiments of the present disclosure.

FIG. 4 depicts an example of a gradient path 304 received by, for example, the image manipulation application 104 as input from a user (e.g., as part of the user input 114) along the source image 102. The source image 102 is illustrated as a blank image in FIG. 4, but the source image 102 represents any image where generation of the color gradient 302 would be desirable. In an example, the gradient path 304 is provided as a series of non-adjacent points 402 that are connected by straight lines 404. The points 402 may be populated along a path of the user input 114 using any line generation technique. In some examples, the gradient path 304 matches the path provided in the user input 114 exactly. That is, instead of extracting points along the path of the user input 114, the gradient path 304 matches the entirety of the path of the user input 114. The path of the user input 114 that results in the gradient path 304 may be provided by a user by swiping across a touch screen display that is displaying the source image 102, or a user may draw the path of the user input 114 using any other input component of the computing environment 100.

Figure 5:
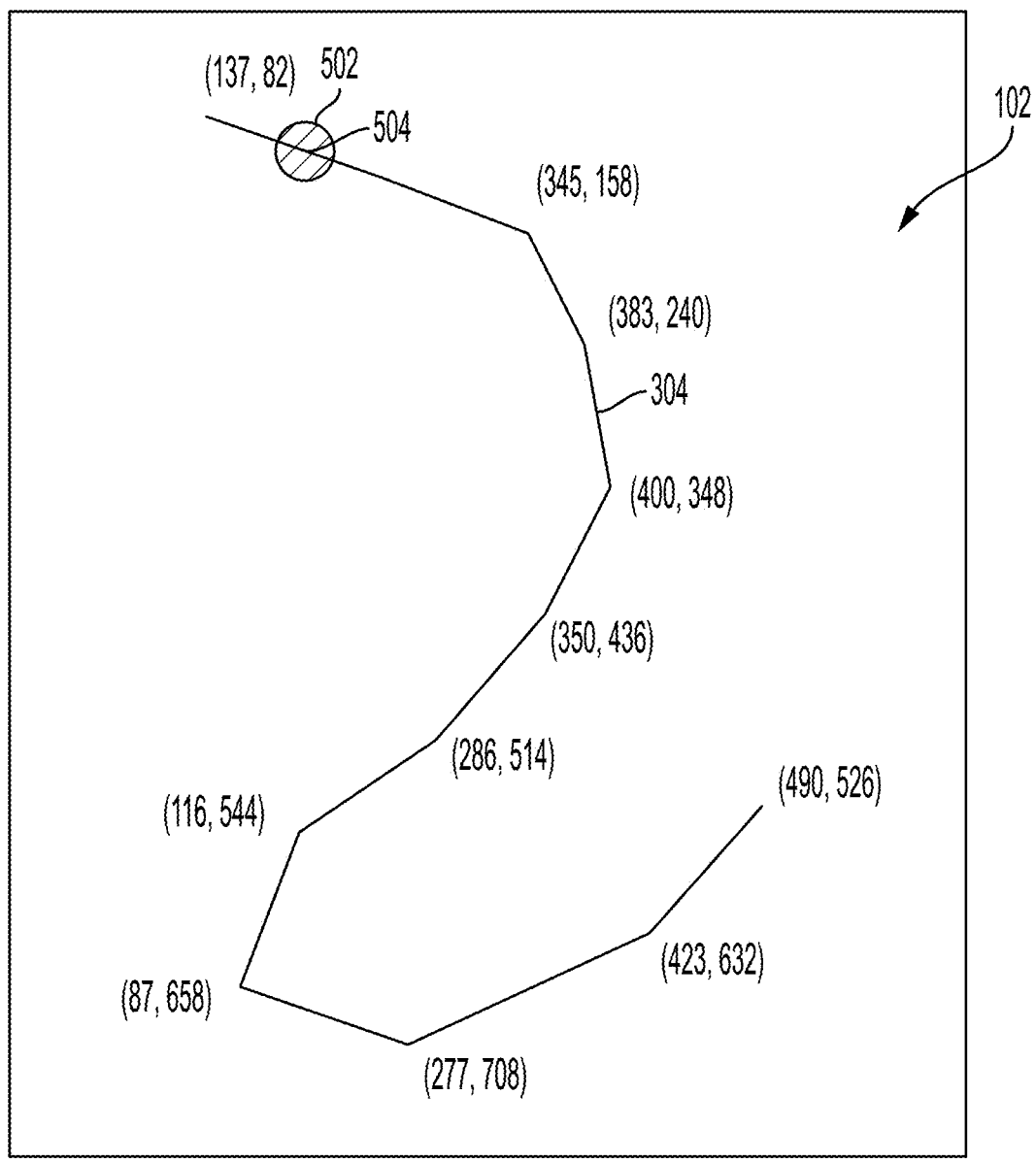
FIG. 5 depicts an example of the gradient path of FIG. 4 including a representation of an average pixel color along the gradient path, according to certain embodiments of the present disclosure.

FIG. 5 depicts an example of the gradient path 304 including a representation 502 of an average pixel color of a pixel 504 along the gradient path 304. Each pixel along the determined gradient path 304 is assigned a color representation 502. For example, if the gradient path 304 includes N pixels, then N color representations are calculated. The color representation 502 is an average color of all of the pixels within a radius surrounding the pixel 504. Taking the average color of all of the pixels within the radius surrounding the pixel 504 avoids an impact of small artifacts that may be present in the source image 102 at the pixel 504. Avoiding the impact of the small artifacts is beneficial because the small artifacts may not be relevant to the color gradient 302. In an example, the color representation 502 is represented by a red-green-blue (RGB) color space. Other color spaces may also be used, such as a cyan-magenta-yellow-black (CMYK) color space.

Figure 6:
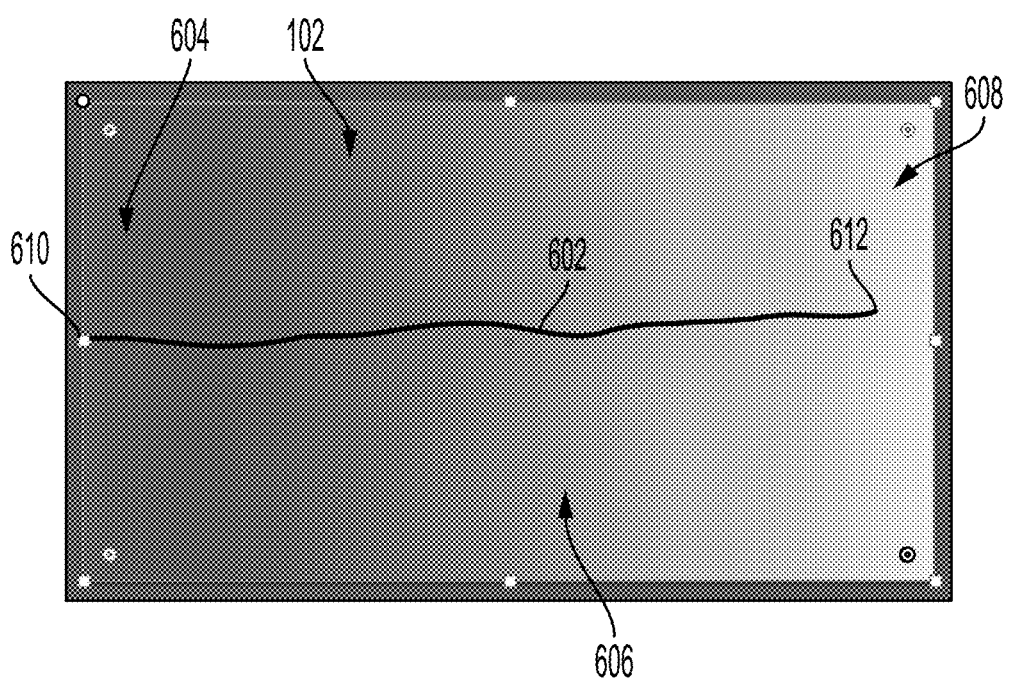
FIG. 6 depicts an additional example of a gradient path input by a user along a source image, according to certain embodiments of the present disclosure.

FIG. 6 depicts an example of a gradient path 602 input by a user (e.g., the user input 114) along the source image 102. For simplicity, the gradient path 602 transitions from red 604 to green 606 to yellow 608. Accordingly, all of the colors along the gradient path 602 can be represented by red and green values in the RGB color space without any blue values. Because of this, colors along the gradient path 602 may be compared in a two-dimensional space, as shown in FIG. 7 below, rather than a three-dimensional space.

Each color representation Ci of the pixels along the gradient path 602 can be represented using a red component, a green component, and a blue component. For example, the color representation Ci is represented by Ri, Gi, and Bi. Given the color representation series [C1, C2, . . . , Cn] extracted from the gradient path 602 and a number of color pivots 306 identified by the user input 114, determining the color representations associated with the color pivots 306 can be treated as a segmentation problem. At an initial iteration, there is one segment. For example, every pixel between a start pixel 610 and an end pixel 612 along the gradient path 602 is included within the segment. For a color gradient 302 with one color pivot 306, a color representation from the entire color representation series [C1, C2, . . . , Cn] is chosen to represent the color pivot 306. The color pivot 306 is determined by comparing areas of triangles between color representations of the start pixel 610 (i.e., C1), the end pixel 612 (i.e., Cn), and each of the interim pixels (i.e., Ci). The triangle with the largest area is selected as the color pivot 306.

Figure 7:
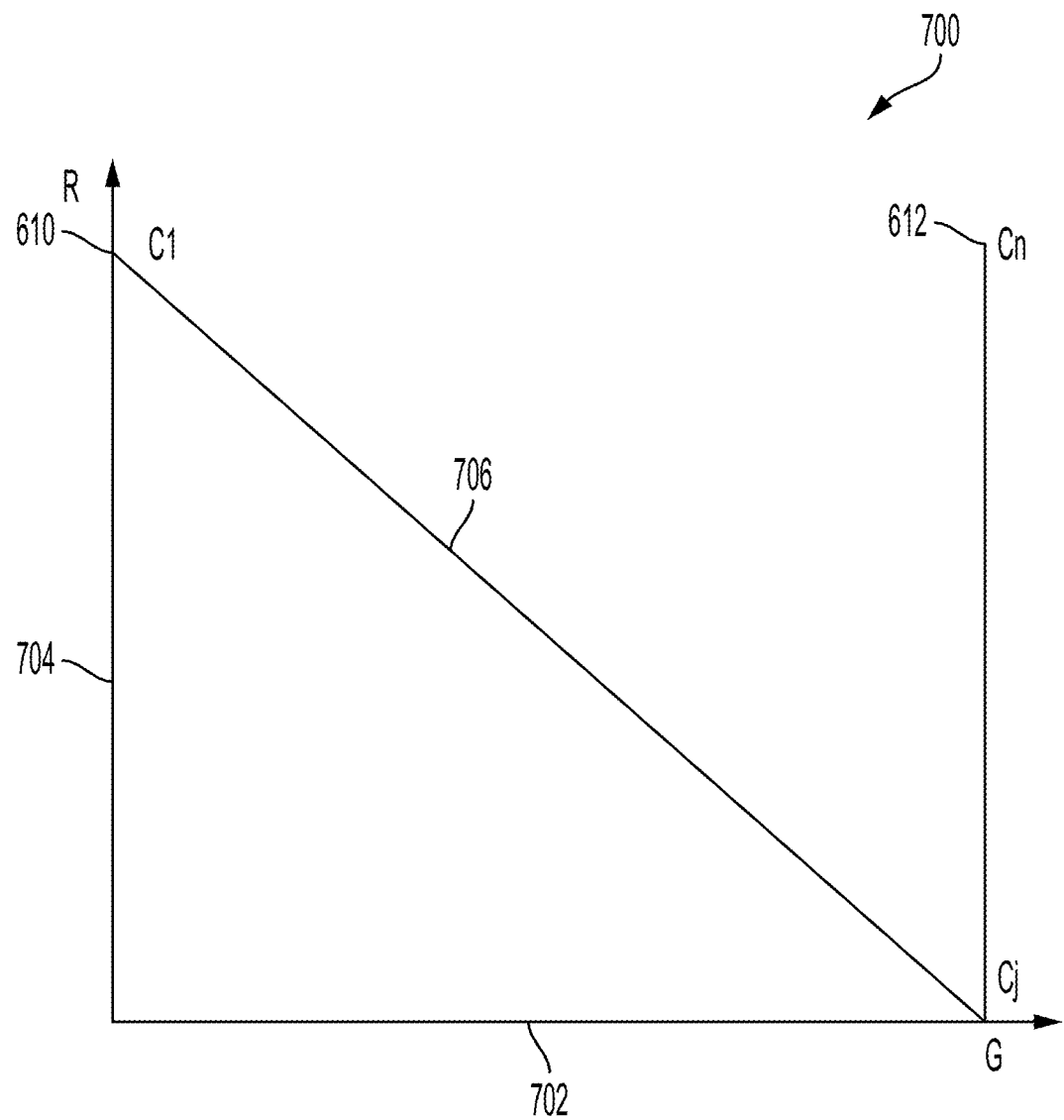
FIG. 7 depicts an example of a graph depicting a color space area between pixels along the gradient path, according to certain embodiments of the present disclosure.

To help illustrate the comparison of areas of triangles, FIG. 7 depicts an example of a graph 700 depicting a color space area between pixels along the gradient path 602. An abscissa 702 represents a green value in the RGB color space, and an ordinate 704 represents a red value in the RGB color space. As mentioned above, the source image 102 depicted in FIG. 6 does not include a blue component in the RGB color space. Accordingly, each of the color representations in the color representation series [C1, C2, . . . , Cn] can be depicted in two dimensions along the red-green plane of the RGB color space. The graph 700 includes a line 706 that provides color representations for each of the pixels along the gradient path 602, where the start pixel 610 is represented by the color representation C1, and the end pixel 612 is represented by the color representation Cn.

For each color representation Ci between C1 and Cn, the image manipulation application 104 computes an area of the triangle formed by C1, Cn, and Ci. The color representation Cj has the largest triangle area of all of the interim color representations Ci. Thus, the color representation Cj is selected as the pivot color 306 for the color gradient 302. A position value (e.g., a placement location along the color gradient 302) for Cj is computed as j/n. Based on establishing the color representation Cj as the pivot color 306, two segments are generated. That is a first segment of interim color representations between C1 and Cj and a second segment of interim color representations between Cj and Cn are created. If more color pivots 306 are desired, as indicated by the user input 114, the triangle area comparison is applied to each of the two new segments as it was to the original segment to identify two potential pivot colors 306. Of the two potential pivot colors 306, the potential pivot color 306 with the larger triangle area is selected as the new pivot color 306.

In one or more additional examples, the color space may have more than three dimensions. For example, a CMYK color space includes four dimensions. In such an example, the triangle area approach continues to work, but the triangle area is calculated in four dimensions. Other dimensional triangles can also be used depending on the dimensions represented in a particular color space.

Figure 8:
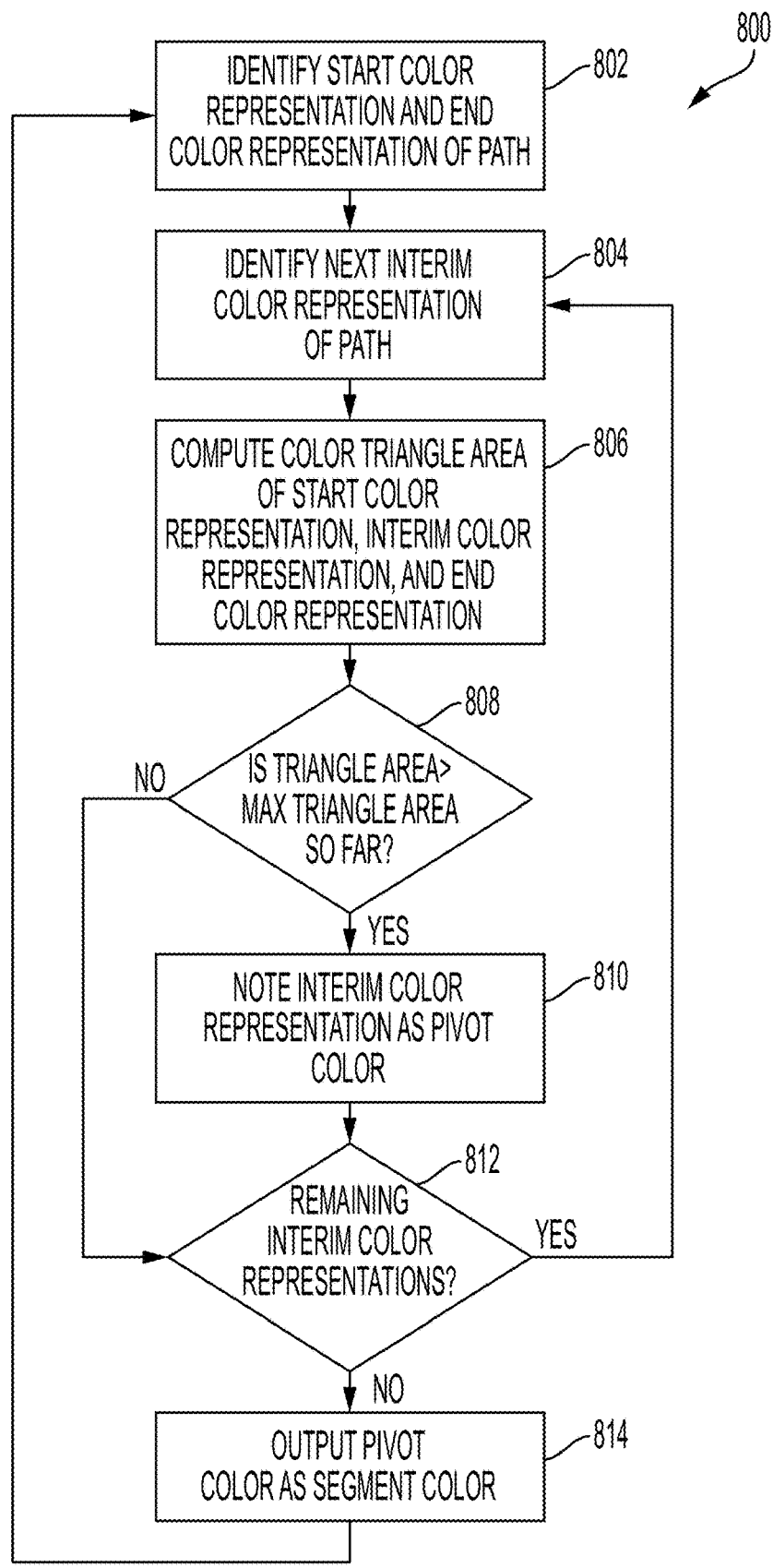
FIG. 8 depicts an example of a process for selecting color pivots along the gradient path, according to certain embodiments of the present disclosure.

FIG. 8 depicts an example of a process 800 for selecting the pivot colors 306 from the gradient path 602. One or more processing devices implement operations depicted in FIG. 8 by executing suitable program code (e.g., the image manipulation application 104). For illustrative purposes, the process 800 is described with reference to certain examples depicted in the figures. Other implementations, however, are possible.

At block 802, the process 800 involves the color pivot engine 110 identifying a start color representation (i.e., the color representation C1) and an end color representation (i.e., the color representation Cn) of the gradient path 602. One or more processing devices execute the color pivot engine 110 (or other suitable program code) to implement block 802. In some embodiments, the start color representation is the color representation of the start pixel 610, and the end color representation is the color representation of the end pixel 612.

At block 804, the process 800 involves the color pivot engine 110 identifying a next interim color representation of the gradient path 602. One or more processing devices execute the color pivot engine 110 to implement block 804. In an example, the next interim color representation of the gradient path 602 is a color representation of the pixel next to the start pixel 610.

At block 806, the process 800 involves the color pivot engine 110 computing a color triangle area of the start color representation, the interim color representation, and the end color representation. One or more processing devices execute the color pivot engine 110 to implement block 806. In the RGB color space, the color triangle area is generated by determining an area of the triangle formed by the RGB components of the start color representation, the interim color representation, and the end color representation.

At block 808, the process 800 involves the color pivot engine 110 determining if the color triangle area is the largest triangle area computed so far. One or more processing devices execute the color pivot engine 110 to implement block 808. If the color triangle area is not the largest triangle area computed so far, the process 800 proceeds to block 812. If the color triangle area is the largest triangle area computed so far, the process 800 proceeds to block 810.

At block 810, the process 800 involves the color pivot engine 110 noting the interim color representation as the pivot color 306. One or more processing devices execute the color pivot engine 110 to implement block 810. By designating the interim color representation as the pivot color 306, the color pivot engine 110 stores the interim color representation as the pivot color 306 until or unless a subsequent interim color representation generates a larger color triangle area at block 806.

At block 812, the process 800 involves the color pivot engine 110 determining if there are any remaining interim color representations. One or more processing devices execute the color pivot engine 110 to implement block 812. If there are remaining interim color representations (e.g., an interim color representation associated with a subsequent pixel along the gradient path 602), then the process returns to block 804 so that the process 800 can calculate a subsequent color triangle area for the next interim color representation. If there are no remaining interim color representations (e.g., the next color representation is the end color representation associated with the end pixel 612), then the process proceeds to block 814.

At block 814, the process 800 involves the color pivot engine 110 outputting the pivot color 306 as a segment color. One or more processing devices execute the color pivot engine 110 to implement block 814. The color pivot engine 110 uses the segment color to identify the new end color of a new first segment and a new start color of a new second segment. Upon outputting the segment color, the process 800 can begin again for the first segment (e.g., from the start color representation C1 to the segment color representation Cj) and for the second segment (e.g., from the segment color representation Cj to the end color representation Cn) if an additional pivot color 306 is desired, as indicated in the user input 114. In such an example, the additional pivot color 306 will be the interim color representation from either of the first segment or the second segment that has the largest color triangle area. The process 800 may be repeated for each set of new segments until the desired number of pivot colors 306 are reached.

Figure 9:
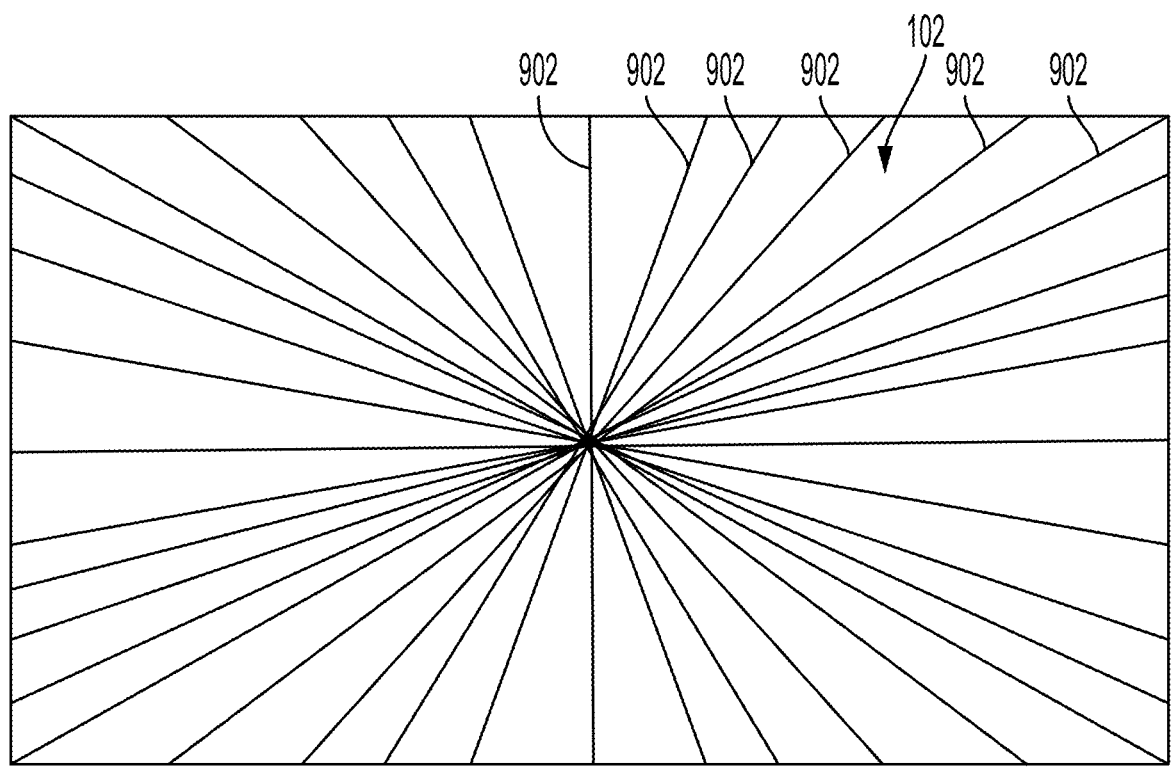
FIG. 9 depicts an example of a set of automated potential gradient paths along a source image, according to certain embodiments of the present disclosure.

FIG. 9 depicts an example of a set of automated potential gradient paths 902 along the source image 102, according to certain embodiments of the present disclosure. Instead of generating the gradient path 304 using the user input 114, the potential gradient paths 902 are automatically generated from a series of straight paths through the source image 102. To determine which of the potential gradient paths 902 will be used for extracting a color gradient 302, each of the potential gradient paths 902 are ranked based on a gradient goodness score determined for each of the potential gradient paths 902, as discussed below with respect to FIG. 10. The potential gradient path 902 with the best gradient goodness score is selected, and the color gradient 302 is extracted in the same manner as the user input gradient path 304. FIG. 9 depicts one possible arrangement of the automated potential gradient paths 902, but other arrangements of the automated potential gradient paths 902 are also contemplated (e.g., grids, random paths, other patterns, etc.).

Figure 10:
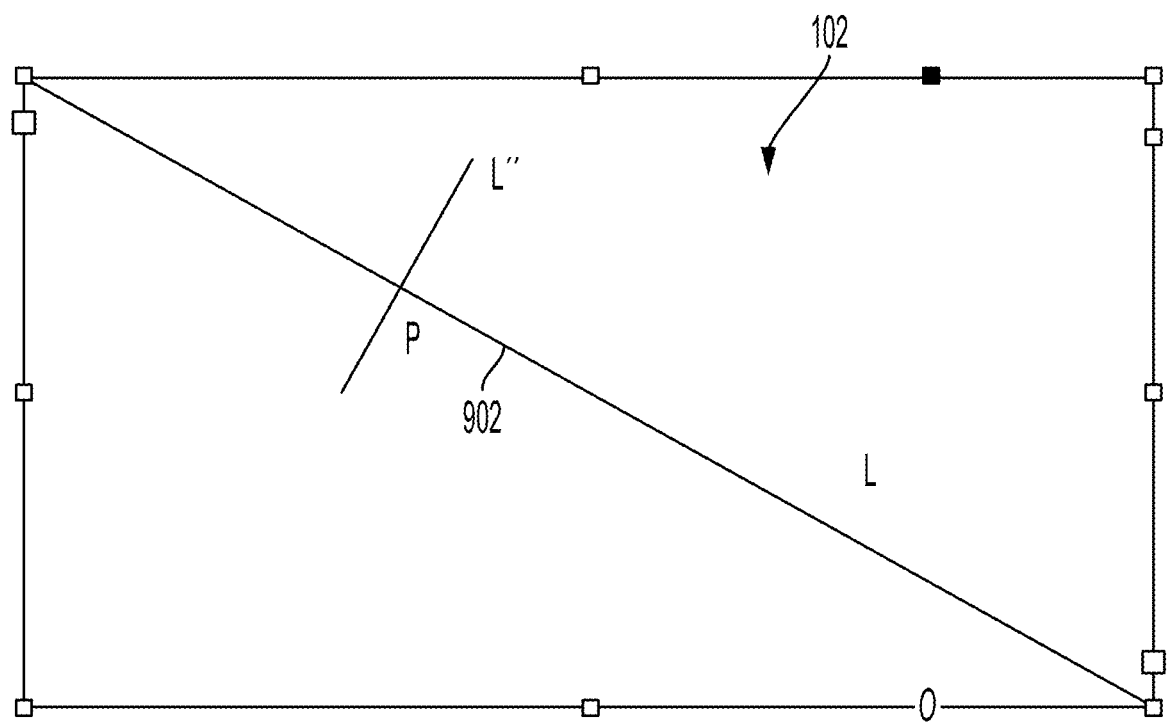
FIG. 10 depicts an example of a potential gradient path used to determine a gradient goodness score, according to certain embodiments of the present disclosure.

FIG. 10 depicts an example of a potential gradient path 902 used to determine a gradient goodness score. The potential gradient path 902 represents one of the potential gradient paths 902 across the source image 102 depicted in FIG. 9. To determine the gradient goodness score of the potential gradient path 902, a set of points P are identified with equidistant spacing along a length of the potential gradient path 902. In an example, the set of points P includes 100 points extending along the length of the potential gradient path 902. Other numbers of point P may also be selected.

At each of the points P along the potential gradient path 902, a local variance score is computed. The local variance score of a point P is computed on a line L″ that is perpendicular to the potential gradient path 902 at the point P. In an example, the line L″ has a length of 40 pixels, but other lengths of the line L″ can also be used. A color representation Ca represents an average color of all of the pixels along the line L″. The local variance of a point P may be represented by the following equation:

$$V_{loc} = \Sigma_{i=1}^{n}(p_i.r - Ca.r)^2 + (p_i.g - Ca.g)^2 + (p_i.b - Ca.b)^2) \quad \text{(Equation 1)}.$$

In Equation 1, $V_{loc}$ is the local variance at a point P, $p_i.r$ is a red color representation value of a pixel $p_i$ along the line L″, $p_i.g$ is a green color representation value of a pixel $p_i$ along the line L″, $p_i.b$ is a blue color representation value of a pixel $p_i$ along the line L″, Ca.r is an average red color representation value of the pixels along the line L″, Ca.g is an average green color representation value of the pixels along the line L″, and Ca.b is an average blue color representation value of the pixels along the line L″.

After the local variance for each pixel in the line L″ is calculated, the total local variance for the potential gradient path 902 is calculated. The total local variance of the potential gradient path 902 may be represented by the following equation:

$$V_{tot} = \Sigma_{i=i}^{n} V_{loc.i} \qquad \text{(Equation 2)}.$$

In Equation 2, $V_{tot}$ is the total local variance for the potential gradient path and $V_{loc.i}$ is the local variance for each line L″ associated with each point P along the potential gradient path 902. If the potential gradient path 902 is a good candidate for extracting the color gradient 302, then the potential gradient path 902 will have a large total color variance, but the L″ lines perpendicular to the potential gradient path 902 will not have a large color variance. Accordingly, a potential gradient path 902 that is a good candidate for extracting the color gradient 302 will have a total local variance that is smaller than the other potential gradient paths 902 and a line variance that is greater than the other potential gradient paths 902.

The line variance of the potential gradient path 902 may be represented by the following equation:

$$V_{line} = \Sigma_{i=1}^{n} (p_i.r - CL.r)^2 + (p_i.g - CL.g)^2 + (p_i.b - CL.b)^2) \qquad \text{(Equation 3)}.$$

In Equation 3, $V_{line}$ is the line variance of the potential gradient path 902, $p_i.r$ is a red color representation value of a pixel $p_i$ along the potential gradient path 902, $p_i.g$ is a green color representation value of a pixel $p_i$ along the potential gradient path 902, $p_i.b$ is a blue color representation value of a pixel $p_i$ along the potential gradient path 902, CL.r is an average red color representation value of the pixels along the potential gradient path 902, CL.g is an average green color representation value of the pixels along the potential gradient path 902, and CL.b is an average blue color representation value of the pixels along the potential gradient path 902. As mentioned above, a color gradient 302 benefits from the potential gradient path 902 having a line variance value that is high in comparison to line variance values of the other potential gradient paths 902.

Because a color gradient 302 benefits from a potential gradient path 902 having a high line variance value and a low total local variance value, a gradient goodness score can be calculated using both the line variance and the total local variance. For example, the gradient goodness score may be represented by the following equation:

$$GGS = \frac{V_{line}}{V_{tot} + \varepsilon}. \qquad \text{(Equation 4)}$$

In Equation 4, GGS is the gradient goodness score of the potential gradient path 902, $V_{line}$ is the line variance value of the potential gradient path 902, and $V_{tot}$ is the total local variance value of the potential gradient path 902, and E is a small constant that avoids dividing by zero if an image is a completely flat color (i.e., $V_{tot}$ equals zero). The gradient goodness score may be calculated for each of the potential gradient paths 902 generated for the source image 102, and the potential gradient path 902 with the largest gradient goodness score is selected for extraction of the color gradient 302 using the same techniques as those described above for the manually input gradient path 304.

Example of a Computing System for Executing an Image Manipulation Application

Figure 11:
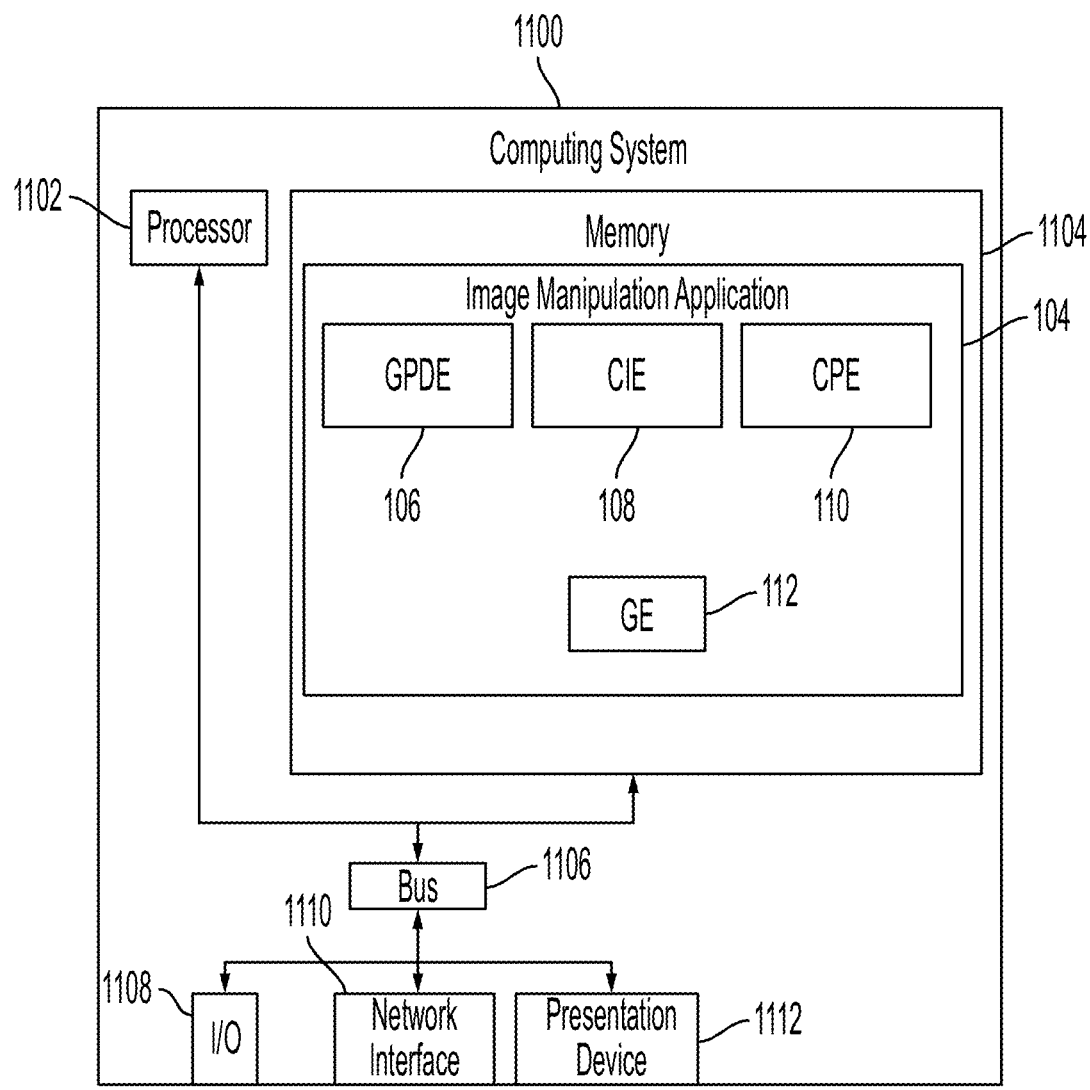
FIG. 11 depicts an example of a computing system for performing various operations described herein, according to certain embodiments of the present disclosure.

Any suitable computing system or group of computing systems (e.g., cloud computing networks in a software-as-a-service implementation) can be used for performing the operations described herein. FIG. 11 depicts an example of a computing system 1100 for performing various operations described herein, according to certain embodiments of the present disclosure. In some embodiments, the computing system 1100 executes the image manipulation application 104, as depicted in FIG. 11. In other embodiments, separate computing systems having devices similar to those depicted in FIG. 11 (e.g., a processor, a memory, etc.) separately execute the image manipulation application 104.

The depicted example of a computing system 1100 includes a processor 1102 communicatively coupled to one or more memory devices 1104. The processor 1102 executes computer-executable program code stored in a memory device 1104, accesses information stored in the memory device 1104, or both. Examples of the processor 1102 include a microprocessor, an application-specific integrated circuit ("ASIC"), a field-programmable gate array ("FPGA"), or any other suitable processing device. The processor 1102 can include any number of processing devices, including a single processing device.

The memory device 1104 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1100 may also include a number of external or internal devices, such as input or output devices. For example, the computing system 1100 is shown with one or more input/output ("I/O") interfaces 1108. An I/O interface 1108 can receive input from input devices or provide output to output devices. One or more buses 1106 are also included in the computing system 1100. The bus 1106 communicatively couples one or more components of a respective one of the computing system 1100.

The computing system 1100 executes program code that configures the processor 1102 to perform one or more of the operations described herein. The program code includes, for example, the image manipulation application 104, the image color analyzer 106, the recoloring engine 108, the placement engine 110, the gradient engine 112, or other suitable applications that perform one or more operations described herein. The program code may be resident in the memory device 1104 or any suitable computer-readable medium and may be executed by the processor 1102 or any other suitable processor. In additional or alternative embodiments, the program code described above is stored in one or more other memory devices accessible via a data network.

The computing system 1100 also includes a network interface device 1110. The network interface device 1110 includes any device or group of devices suitable for establishing a wired or wireless data connection to one or more data networks. Non-limiting examples of the network interface device 1110 include an Ethernet network adapter, a modem, and/or the like. The computing system 1100 is able to communicate with one or more other computing devices (e.g., a computing device executing an image manipulation application 104) via a data network using the network interface device 1110.

In some embodiments, the computing system 1100 also includes the presentation device 1112. A presentation device 1112 can include any device or group of devices suitable for providing visual, auditory, or other suitable sensory output. Non-limiting examples of the presentation device 1112 include a touchscreen, a monitor, a speaker, a separate mobile computing device, etc. In some aspects, the presentation device 1112 can include a remote client-computing device that communicates with the computing system 1100 using one or more data networks described herein. Other aspects can omit the presentation device 1112.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   generating a set of potential gradient paths for a source image, wherein each potential gradient path of the set of potential gradient paths is a diagonal line traversing through the source image;
   determining, for each potential gradient path of the set of potential gradient paths, a gradient goodness score for the potential gradient path, wherein the gradient goodness score indicates an estimated measure of color variance along the potential gradient path;
   selecting, from the set of potential gradient paths, a potential gradient path having a highest gradient goodness score;
   determining the selected potential gradient path as a gradient path that represents a color gradient of the source image; and
   identifying a set of colors from the gradient path to determine the color gradient of the source image.

2. The method of claim 1, wherein determining the gradient goodness score for the potential gradient path includes:
   determining a total local variance score of the potential gradient path;
   determining a line variance score of the potential gradient path, wherein the line variance score; and
   determining the gradient goodness score of the potential gradient path based on a ratio between the total local variance score and the line variance score.

3. The method of claim 2, wherein determining the total local variance score of the potential gradient path includes:
   identifying a set of points extending along a length of the potential gradient path;
   determining, for each point of the set of points, a local variance score, wherein the local variance score is calculated based on color values of a line of pixels that: (i) includes a pixel representing the point; and (ii) is formed perpendicular from the potential gradient path; and
   determining the total local variance score based on the local variance scores of the set of points.

4. The method of claim 2, wherein determining the line variance score of the potential gradient path includes:
   identifying a red-color representation value for pixels of the potential gradient path;
   identifying a green-color representation value for the pixels of the potential gradient path;
   identifying a blue-color representation value for the pixels of the potential gradient path; and
   determining the line variance score based on the red-color representation value, the green-color representation value, and the blue-color representation value of the potential gradient path.

5. The method of claim 1, further comprising modifying the determined color gradient of the source image by applying a color pivot between a first color and a second color of the set of colors.

6. The method of claim 5, wherein modifying the determined color gradient of the source image includes increasing a smoothness of the color gradient, wherein the smoothness of the color gradient is increased by reducing a number of color pivots being applied between colors of the set of colors.

7. The method of claim 5, wherein modifying the determined color gradient of the source image includes decreasing a smoothness of the color gradient, wherein the smoothness of the color gradient is decreased by increasing a number of color pivots being applied between colors of the set of colors.

8. A system comprising:
a processing device; and
a memory device communicatively coupled to the processing device and comprising program instructions, wherein when executed, cause the processing device to perform operations comprising:
generating a set of potential gradient paths for a source image, wherein each potential gradient path of the set of potential gradient paths is a diagonal line traversing through the source image;
determining, for each potential gradient path of the set of potential gradient paths, a gradient goodness score for the potential gradient path, wherein the gradient goodness score indicates an estimated measure of color variance along the potential gradient path;
selecting, from the set of potential gradient paths, a potential gradient path having a highest gradient goodness score;
determining the selected potential gradient path as a gradient path that represents a color gradient of the source image; and
identifying a set of colors from the gradient path to determine the color gradient of the source image.

9. The system of claim 8, wherein determining the gradient goodness score for the potential gradient path includes:
determining a total local variance score of the potential gradient path;
determining a line variance score of the potential gradient path, wherein the line variance score; and
determining the gradient goodness score of the potential gradient path based on a ratio between the total local variance score and the line variance score.

10. The system of claim 9, wherein determining the total local variance score of the potential gradient path includes:
identifying a set of points extending along a length of the potential gradient path;
determining, for each point of the set of points, a local variance score, wherein the local variance score is calculated based on color values of a line of pixels that:
(i) includes a pixel representing the point; and (ii) is formed perpendicular from the potential gradient path; and
determining the total local variance score based on the local variance scores of the set of points.

11. The system of claim 9, wherein determining the line variance score of the potential gradient path includes:
identifying a red-color representation value for pixels of the potential gradient path;
identifying a green-color representation value for the pixels of the potential gradient path;
identifying a blue-color representation value for the pixels of the potential gradient path; and
determining the line variance score based on the red-color representation value, the green-color representation value, and the blue-color representation value of the potential gradient path.

12. The system of claim 8, wherein the program instructions further cause the processing device to perform operations comprising:
modifying the determined color gradient of the source image by applying a color pivot between a first color and a second color of the set of colors.

13. The system of claim 12, wherein modifying the determined color gradient of the source image includes increasing a smoothness of the color gradient, wherein the smoothness of the color gradient is increased by reducing a number of color pivots being applied between colors of the set of colors.

14. The system of claim 12, wherein modifying the determined color gradient of the source image includes decreasing a smoothness of the color gradient, wherein the smoothness of the color gradient is decreased by increasing a number of color pivots being applied between colors of the set of colors.

15. A non-transitory computer-readable medium storing program instructions that, when executed by one or more processing devices, cause the one or more processing devices to perform operations comprising:
generating a set of potential gradient paths for a source image, wherein each potential gradient path of the set of potential gradient paths is a diagonal line traversing through the source image;
determining, for each potential gradient path of the set of potential gradient paths, a gradient goodness score for the potential gradient path, wherein the gradient goodness score indicates an estimated measure of color variance along the potential gradient path;
selecting, from the set of potential gradient paths, a potential gradient path having a highest gradient goodness score;
determining the selected potential gradient path as a gradient path that represents a color gradient of the source image; and
identifying a set of colors from the gradient path to determine the color gradient of the source image.

16. The non-transitory computer-readable medium of claim 15, wherein determining the gradient goodness score for the potential gradient path includes:
determining a total local variance score of the potential gradient path;
determining a line variance score of the potential gradient path, wherein the line variance score; and
determining the gradient goodness score of the potential gradient path based on a ratio between the total local variance score and the line variance score.

17. The non-transitory computer-readable medium of claim 16, wherein determining the total local variance score of the potential gradient path includes:
identifying a set of points extending along a length of the potential gradient path;
determining, for each point of the set of points, a local variance score, wherein the local variance score is calculated based on color values of a line of pixels that:
(i) includes a pixel representing the point; and (ii) is formed perpendicular from the potential gradient path; and determining the total local variance score based on the local variance scores of the set of points.

18. The non-transitory computer-readable medium of claim 16, wherein determining the line variance score of the potential gradient path includes:
identifying a red-color representation value for pixels of the potential gradient path;
identifying a green-color representation value for the pixels of the potential gradient path;
identifying a blue-color representation value for the pixels of the potential gradient path; and
determining the line variance score based on the red-color representation value, the green-color representation value, and the blue-color representation value of the potential gradient path.

19. The non-transitory computer-readable medium of claim 15, wherein the program instructions further cause the processing device to perform operations comprising:
modifying the determined color gradient of the source image by applying a color pivot between a first color and a second color of the set of colors.

20. The non-transitory computer-readable medium of claim 19, wherein modifying the determined color gradient of the source image includes increasing a smoothness of the color gradient, wherein the smoothness of the color gradient is increased by reducing a number of color pivots being applied between colors of the set of colors.

\* \* \* \* \*